(12) United States Patent
Ishiwa et al.

(10) Patent No.: US 7,359,012 B2
(45) Date of Patent: Apr. 15, 2008

(54) LIQUID CRYSTAL DISPLAY DEVICE

(75) Inventors: Masaru Ishiwa, Kawasaki (JP); Tetsuya Hamada, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 517 days.

(21) Appl. No.: 11/023,978

(22) Filed: Dec. 28, 2004

(65) Prior Publication Data
US 2006/0012731 A1    Jan. 19, 2006

(30) Foreign Application Priority Data
Jul. 13, 2004    (JP) .............................. 2004-206332

(51) Int. Cl.
*G02F 1/1335* (2006.01)
(52) U.S. Cl. .................. 349/65; 349/62; 349/64; 362/555; 362/631
(58) Field of Classification Search ................. 349/62, 349/65, 64; 362/631, 634, 555
See application file for complete search history.

(56) References Cited

U.S. PATENT DOCUMENTS

| | | | |
|---|---|---|---|
| 5,283,563 A | | 2/1994 | Allen et al. |
| 5,803,573 A | | 9/1998 | Osawa et al. |
| 6,048,071 A | * | 4/2000 | Sawayama ................... 362/603 |
| 6,992,736 B2 | * | 1/2006 | Saito et al. ................... 349/58 |
| 7,101,073 B2 | * | 9/2006 | Li ............................. 362/621 |
| 7,139,048 B2 | * | 11/2006 | Han et al. ..................... 349/62 |
| 7,202,920 B2 | * | 4/2007 | Aoyagi et al. ................ 349/62 |
| 2003/0030765 A1 | * | 2/2003 | Hayashi et al. ............... 349/65 |
| 2005/0200773 A1 | * | 9/2005 | Chang ......................... 349/64 |

FOREIGN PATENT DOCUMENTS

| | | |
|---|---|---|
| JP | 6-317716 | 11/1994 |
| JP | 8-190095 | 7/1996 |
| JP | 10-260404 | 9/1998 |
| JP | 2000-321400 | 11/2000 |
| JP | 2000-321440 | 11/2000 |
| JP | 2002-289023 | 10/2002 |
| JP | 2004-178957 | 6/2004 |
| JP | 2004-184493 | 7/2004 |
| KR | 0169383 | 12/1996 |

* cited by examiner

*Primary Examiner*—Toan Ton
*Assistant Examiner*—John Heyman
(74) *Attorney, Agent, or Firm*—Greer, Burns & Crain, Ltd.

(57) ABSTRACT

A liquid crystal display device efficiently uses light from light sources by positioning the light sources with respect to a light-guiding member for back lighting with minimized air gap therebetween. The light-guiding member provided on a backside of a liquid crystal panel. The light sources emit light toward a side surface of the light-guiding member. The light sources are aligned and fixed to a board that is fixed to the light-guiding member.

7 Claims, 8 Drawing Sheets

LIQUID CRYSTAL DISPLAY DEVICE

BACKGROUND OF THE INVENTION

1. Field of the Invention

The present invention generally relates to liquid crystal display devices and, more particularly to a liquid crystal display device in which a liquid crystal panel is illuminated from backside by a lighting device having a light source, a light-guiding member, an optical sheet, etc.

2. Description of the Related Art

A description will be given first, with reference to FIG. 1, of a conventional liquid crystal display. FIG. 1 is an exploded perspective view of a conventional liquid crystal display device.

The liquid crystal display device shown in FIG. 1 also serves as an information input unit, and comprises an information input panel 1, a bezel 2, a liquid crystal panel 3, two optical sheets 4, a light-guiding member 5, a reflective sheet 6 and a frame 7. The liquid crystal panel 3, the optical sheets 4, the light-guiding member 5 and the reflective sheet 6 are situated between the frame 7 and the bezel 2. The optical sheets 4, the light-guiding member 5 and the reflective sheet 6 together serve as a part of a back light device that illuminates the liquid crystal panel 3 from backside. The information input panel 1 is arranged on the bezel 2.

A plurality of light-emitting diodes (light source) 9 attached to a printed circuit board 8 are arranged at a side surface of the light-guiding member 5. A light emitted from the light-emitting diodes 9 is diffused by the concavo-convex pattern of the surface (reflective sheet side) of the light-guiding member 5 while transmitting inside the light-guiding member 5, and travels in a direction toward the liquid crystal panel 3. The light exiting the light-guiding member 5 on the opposite side of the liquid crystal panel 3 returns to the light-guiding member 5 by being reflected by the reflective sheet 6, and finally travels in a direction toward the liquid crystal panel 3. Thereby, the liquid crystal panel 3 is illuminated entirely from backside (back light), which brings a display on the liquid crystal panel 3 into sight.

The printed circuit board 8 having the light-emitting diodes 9 mounted thereon has through holes 8A on opposite ends thereof so that the printed circuit board 8 is positioned with respect to the frame 7 by fitting the through holes on projections 7A of the frame 7. Additionally, the light-guiding member 5 is positioned with respect to the frame 7 by the outer periphery thereof fitting into a side surface or a recess of the frame 7. Thereby, the light-emitting diodes 9 attached to the printed circuit board 8 are positioned in a state where the light-emitting diodes 9 align along the side surface of the light-guiding member 5. The light of the light-emitting diodes 9 can be guided to the light-guiding member 5 by the light-emitting surfaces of the light-emitting diodes 9 facing the side surface of the light-guiding member 5. An input part 8B extends from the printed circuit board 8 so that an electric current for illumination is supplied to the light-emitting diodes 9 through the input part 8B.

It should be noted that a substrate 3A extends from one side of the liquid crystal panel so as to input a drive signal to the liquid crystal panel 3. Additionally, a board 1A extends from the information input panel 1 so as to output a signal. Moreover, the information input panel 1 is not indispensable for the liquid crystal display device, and there is no need to provide the information input panel 1 if only a display function is needed and the information input function is not needed.

With the above-mentioned structure, the printed circuit board 8 to which the light-emitting diodes 9 are fixed is positioned with respect to the frame 7, and the light-guiding member 5 is also positioned with respect to the frame 7. According to such a positioning structure, a positioning error of the printed circuit board 8 with respect to the frame 7 and a positioning error of the light-guiding member 5 with respect to the frame 7 are added, which may form a large air gap between the light-emitting diodes 9 and the light-guiding member 5. If a large air gap is formed between the light-emitting diodes 9 and the light-guiding member 5, the light from the light emitting diodes 9 scatters outside through the air gap, which raises a problem in that the light from the light-emitting diodes 9 cannot be efficiently introduced into the light-guiding member 5.

Moreover, if the number of light-emitting diodes 9 is not sufficient as shown in FIG. 3, there may be a problem in that an uneven illumination occurs in the light emitted from the entire light-guiding member 5 when the light of the light-emitting diodes 9 is input to the light-guiding member 5 since an interval between the light-emitting diodes 9 is too large.

SUMMARY OF THE INVENTION

It is a general object of the present invention to provide an improved and useful liquid crystal display device in which the above-mentioned problems are eliminated.

A more specific object of the present invention is to provide a liquid crystal display device which efficiently uses light from a light source by positioning the light source with respect to a light-guiding member for back lighting with minimized air gap therebetween.

In order to achieve the above-mentioned objects, there is provided according to the present invention a liquid crystal display device having a back light illumination, comprising: a light-guiding member provided on a backside of a liquid crystal panel; and a plurality of light sources that emit light toward a side surface of the light-guiding member, wherein the light-sources are aligned and fixed to a board that is fixed to the light-guiding member.

In the liquid crystal display device according to the present invention, the light-guiding member may have a planer quadrate shape, and a notch part may be provided on one side of the quadrate shape so as to accommodate the aligned light sources in the notch part. Alternatively, the light-guiding member may have a planer quadrate shape, and an elongated opening may be provided along one side of the quadrate shape so that the aligned light sources are fitted in the elongated opening.

The liquid crystal display device according to the present invention may further comprise a positioning arrangement that positions the board to the light-guiding member.

Additionally, there is provide according to another aspect of the present invention a liquid crystal display device having a back light illumination, comprising: a light-guiding member provided on a backside of a liquid crystal panel; and a plurality of light sources that emit light toward a side surface of the light-guiding member, wherein the light sources are fixed to the light-guiding member by being fitted in an opening part of the light-guiding member in a state where electrodes to which an electronic power for driving the light sources is supplied are exposed, and a board having electrodes that are brought into contact with the electrodes of the light sources is arranged on the light sources.

In the liquid crystal display device according to the above-mentioned invention, the electrodes of the board may be formed on protruding parts that are formed by deforming the board. The liquid crystal display device may further comprise a positioning arrangement that positions the board to the light-guiding member.

Further, there is provided another aspect of the present invention a liquid crystal display device having a back light illumination, comprising: a light-guiding member provided on a backside of a liquid crystal panel; and a plurality of light sources that emit light toward a side surface of the light-guiding member, wherein an optical part is provided to between the light sources and the light-guiding member so as to guide the light from the light sources to the light-guiding member while diverging the light.

In the liquid crystal display device according to the above-mentioned invention, the optical part may be fixed to the side surface of the light-guiding member. The optical part may include a plurality of optical fibers integrally formed with each other so as to radially extend in a substantially sector pattern from positions where the light sources are provided. The light-guiding member may be fixed to a frame, and the light sources may be accommodated and fixed in a recessed part provided in the frame. The liquid crystal display device may further comprise a positioning arrangement that positions the board to the light-guiding member.

According to the present invention, since the light sources are directly positioned with respect the light-guiding member, an air gap between the light-guiding member and the light sources can be minimized. Thus, a light emitted from the light sources can be efficiently guided to the light-guiding member.

Other objects, features and advantages of the present invention will become more apparent from the following detailed description when read in conjunction with the accompanying drawings.

DETAILED DESCRIPTION OF THE PREFERRED EMBODIMENTS

Figure 1:
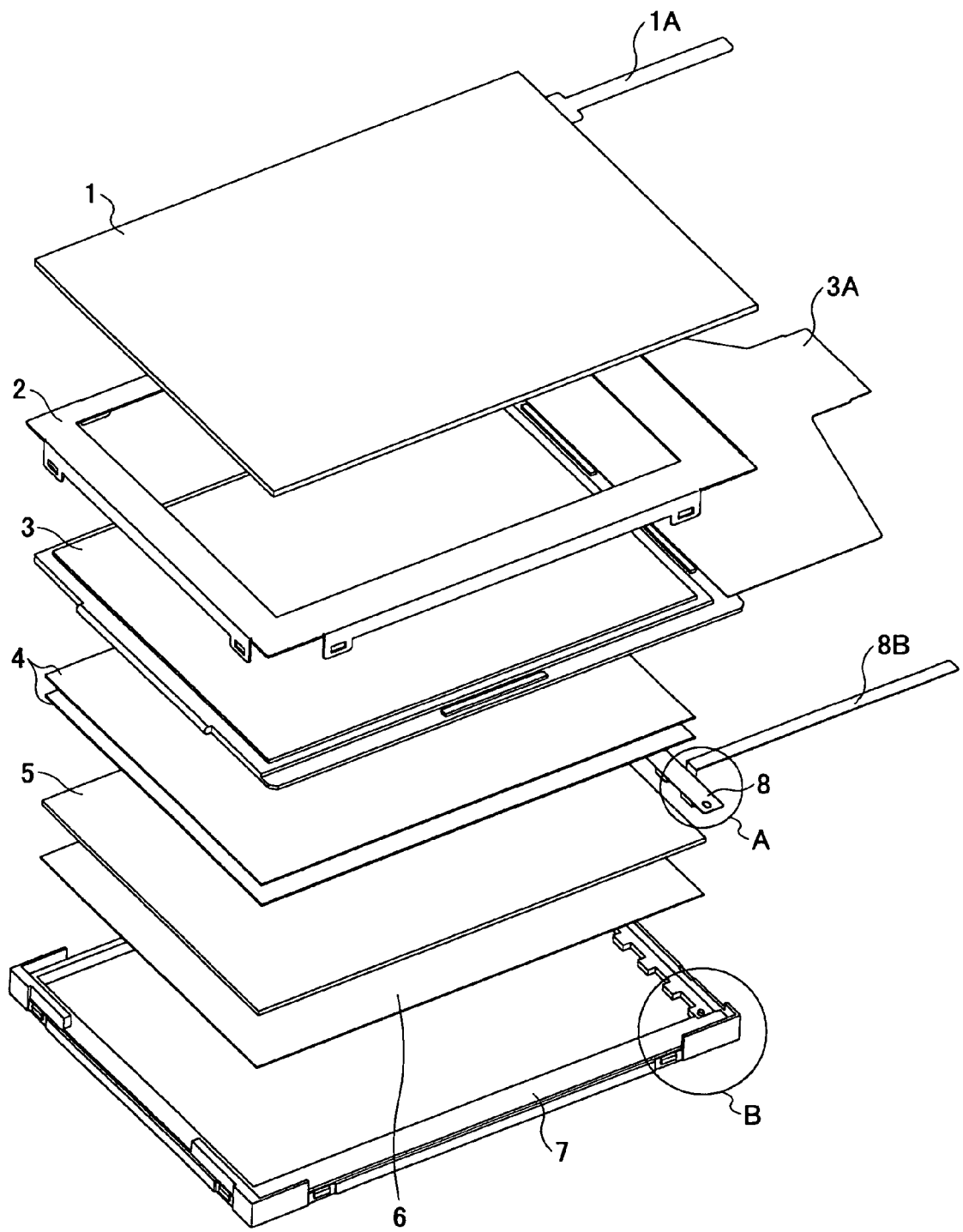
FIG. 1 is an exploded perspective view of a conventional liquid crystal display device.
Figure 2:
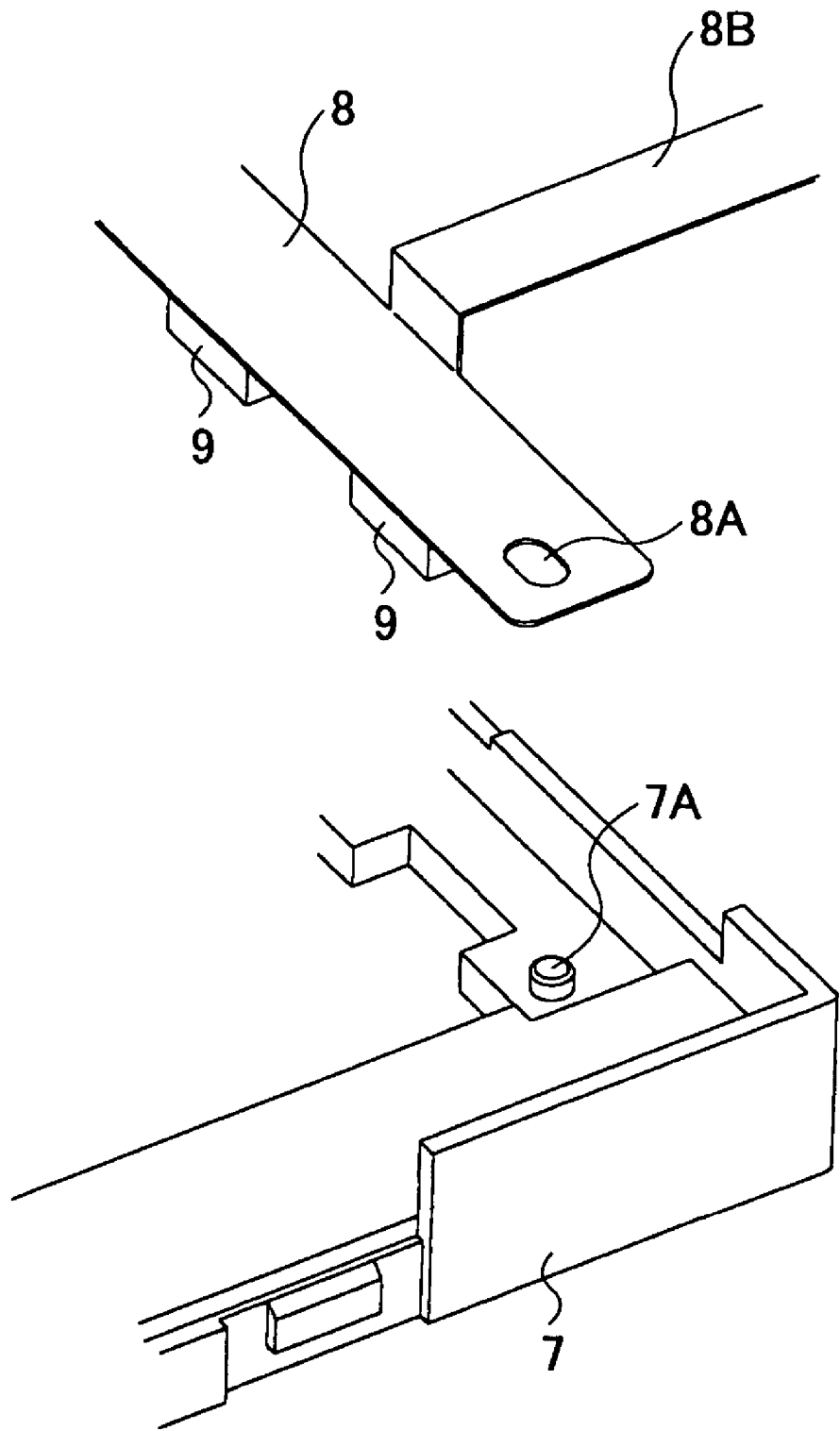
FIG. 2 is an enlarged view of a part A and a part B shown in FIG. 1.
Figure 3:
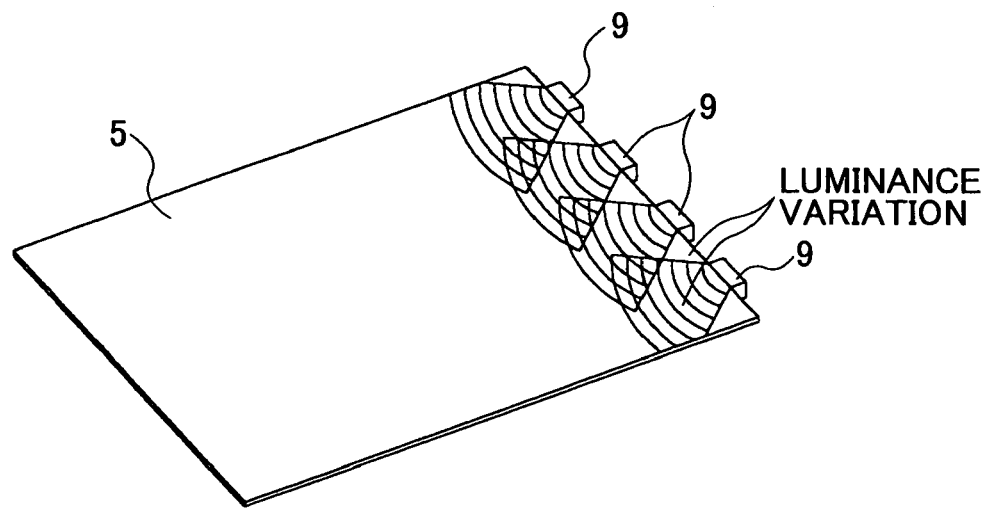
FIG. 3 is a perspective view of a light-emitting member for showing uneven illumination that occurs in a case where a number of light-emitting diodes is not sufficient.

A description will now be given of embodiments of the present invention with reference to the drawings. Liquid crystal display devices according to the embodiments described below have a fundamental structure the same as the liquid crystal display device shown in FIG. 1, and a description thereof will be omitted. However, the information input panel 1 shown in FIG. 1 is not indispensable element, and it can serve as a liquid crystal display device without information input panel 1.

Figure 4:
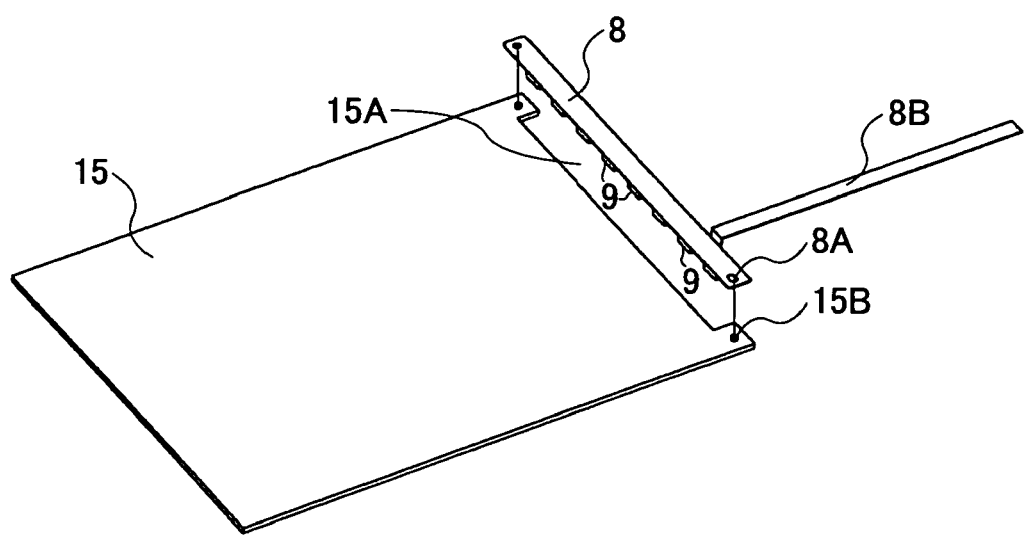
FIG. 4 is a perspective of a light-guiding member and a printed circuit board having light-emitting diodes according to a first embodiment of the present invention.

FIG. 4 is a perspective view showing a light-guiding member and a printed circuit board having light-emitting diodes according to a first embodiment of the present invention. In the present embodiment, the printed circuit board 8 to which the light-emitting diodes 9 are attached is directly mounted to the light-guiding member 15. Structures other than the above-mentioned is the same as that shown in FIG. 1, and descriptions thereof will be omitted.

In FIG. 4, the light-guiding member 15 has a notch part 15A on a side where the light-emitting diodes 9 are arranged. The size of the notch part 15A is set so that the aligned light-emitting diodes 9 can be just fitted in the notch part 15A. Moreover, positioning protrusions 15B are provided on opposite sides of the notch part 15A of the light-emitting member 15. Through holes 8A of the printed circuit board 8 are configured and arranged to fit to the positioning protrusions 15B, respectively, so that the light-emitting surfaces of the light-emitting diodes 9 are positioned at the side surface of the notch part 15A without an air gap therebetween in a state where the through holes 8A fit to the respective positioning protrusions 15B.

It should be noted that the printed circuit board 8 may be attached to the light-guiding member 15 with an adhesive or an adhesive tape, or may be fixed to the light-guiding member 15 by screws.

As mentioned above, in the present embodiment, the printed circuit board 8 is positioned directly to the light-guiding member 15 and is fixed thereto. Accordingly, a positioning error can be set small, which minimizes an air gap between the light emitting diodes 9 and the light-guiding member 15. Therefore, a light emitted from the light-emitting diodes 9 can be guided efficiently to the light-guiding member 15 without loss, and an assembly of the light-guiding member and the light-emitting diodes that can provide a high-luminance can be acquired. Additionally, a liquid crystal display with little variation in luminance between products can be provided.

A description will now be given, with reference to FIG. 5 of a second embodiment of the present invention.

Figure 5:
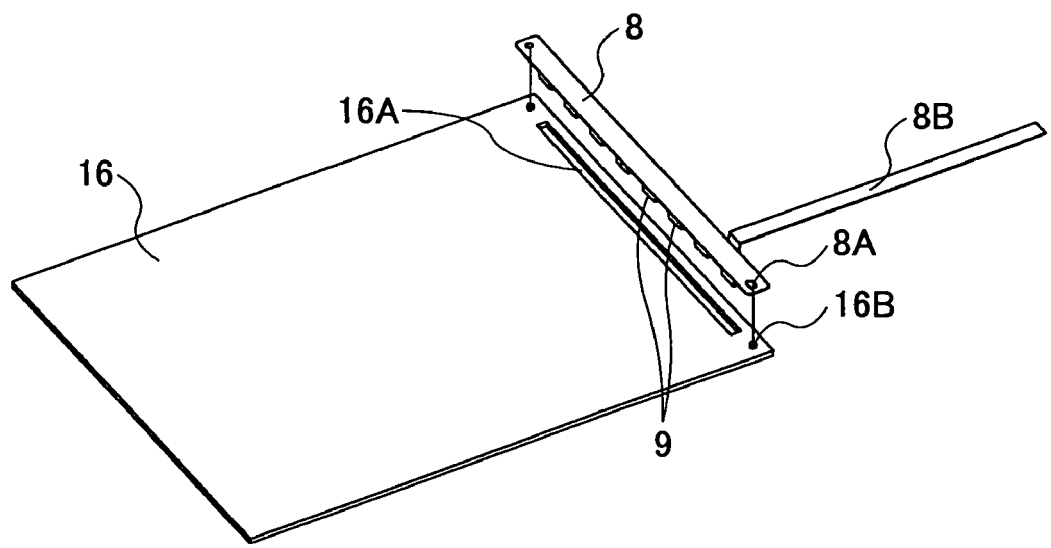
FIG. 5 is a perspective view showing a light-guiding member and a printed circuit board having light-emitting diodes according to a second embodiment of the present invention.

FIG. 5 is a perspective view showing a light-guiding member and a printed circuit board having light-emitting diodes according to a second embodiment of the present invention. In the present embodiment, the printed circuit board 8 to which the light-emitting diodes 9 are attached is directly mounted to the light-guiding member 16. Structures other than the above-mentioned is the same as that of the liquid crystal display device shown in FIG. 1, and descriptions thereof will be omitted.

In FIG. 5, the light-guiding member 16 has an opening part 16A on a side where the light-emitting diodes 9 are arranged. The size of the opening part 16A is set so that the aligned light-emitting diodes 9 are just accommodated in the opening part 16A. Moreover, positioning protrusions 16B are provided on opposite sides of the opening part 16A of the light-emitting member 16. Through holes 8A of the printed circuit board 8 are configured and arranged to fit to the positioning protrusions 16B, respectively, so that the light-emitting surfaces of the light-emitting diodes 9 are positioned at the side surface of the opening part 16A without an air gap therebetween in a state where the thorough holes 8A fit to the respective positioning protrusions 16B.

It should be noted that the printed circuit board 8 may be attached to the light-guiding member 16 with an adhesive or an adhesive tape, or may be fixed to the light-guiding member 16 by screws.

As mentioned above, in the present embodiment, the printed circuit board 8 is directly positioned to the light-guiding member 16, and fixed thereto. Accordingly, a positioning error can be set small, which minimizes an air gap between the light emitting diodes 9 and the light-guiding member 16. Therefore, a light emitted from the light-emitting diodes 9 can be guided efficiently to the light-guiding member 16 without loss, and an assembly of the light-guiding member and the light-emitting diodes that can provide a high-luminance can be acquired. Additionally, a liquid crystal display with little variation in luminance between products can be provided.

Figure 6:
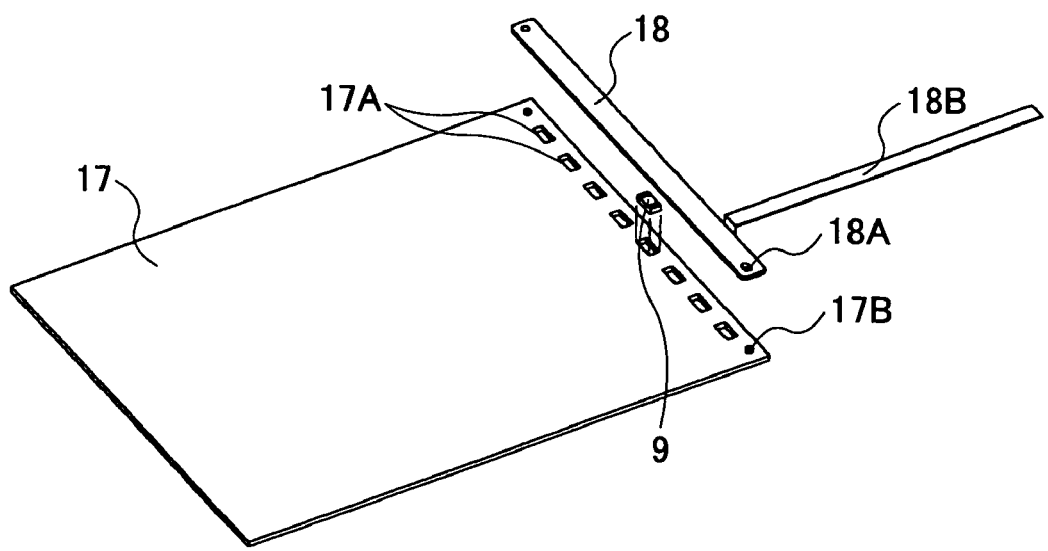
FIG. 6 is a perspective view of a light-guiding member and a printed circuit board having light-emitting diodes according to a third embodiment of the present invention.

A description will now be given, with reference to FIGS. 6 through 10, of a third embodiment of the present invention. FIG. 6 is a perspective view showing a light-guiding member and a printed circuit board having light-emitting diodes according to a third embodiment of the present invention. In the present embodiment, the light-emitting diodes 9 are not fixed to the printed circuit board 8, and are supplied separately from the printed circuit board 8.

Figure 7:
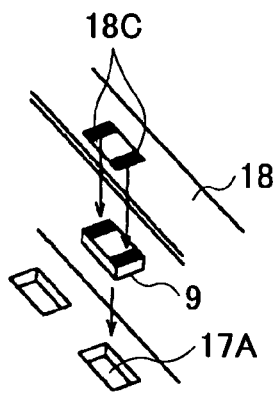
FIG. 7 is an enlarged view of a part the light-emitting diodes are mounted.

That is, an opening part 17A to which the light-emitting diodes 9 fit is formed in a light-emitting member 17 according to the present embodiment. The light-emitting diodes 9 are fitted in the opening part 17A in a state where the light-emitting diodes 9 faces upward as shown in FIG. 7. If the thickness of the light emitting diodes 9 is larger than the thickness of the light-guiding member 17, it is preferable to provide an opening having a size equal to or larger than the opening part 17A also to the reflective sheet 6 arranged under the light-guiding member 17.

In the present embodiment, electrodes 18C are formed on a bottom surface of a printed circuit board 18, that is, a surface facing the light-guiding member 17 so as to be brought into contact with electrodes of the light-emitting diodes 9. Therefore, by arranging and forcing the printed circuit board 18 on the aligned light emitting diodes 9, the electrodes of the printed circuit board 18 and the electrodes of the light-emitting diodes 9 are connected to each other, and they are in a conductive state. Thereby, the light-emitting diodes 9 can be caused to emit a light by supplying an electric current to the light-emitting diodes 9 through the printed circuit board 18. It should be noted that although it is indicated in FIG. 7 that the electrodes 18C are arranged on the upper surface of the printed circuit board 18, they are indicated to show the electrodes 18C for the purpose of convenience, and actually the electrodes 18C are formed on the opposite surface (bottom surface) of the printed circuit board 18 so as to face the light-emitting diodes 9.

Figure 8:
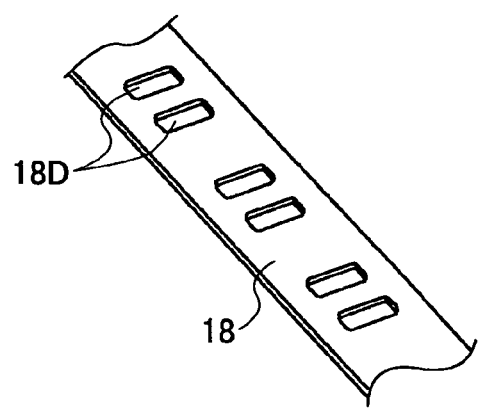
FIG. 8 is an enlarged perspective view of a part of a printed circuit board, which is a variation of the printed circuit board shown in FIG. 6.
Figure 9:
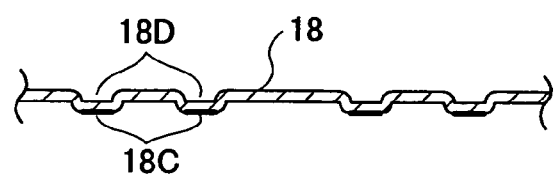
FIG. 9 is a cross-sectional view of the printed circuit board shown in FIG. 8.

Moreover, as shown in FIGS. 8 and 9, it is preferable to form recessed parts 18D by stamping or the like at positions where the electrodes 18C are formed. The recessed parts 18D cause protruding parts being formed on the bottom surface of the printed circuit board 18. That is, by forming the electrodes 18C on the protruding parts 18D of the printed circuit board 18, the contact between the electrodes 18C and the light-emitting diodes 9 is acquired.

Figure 10:
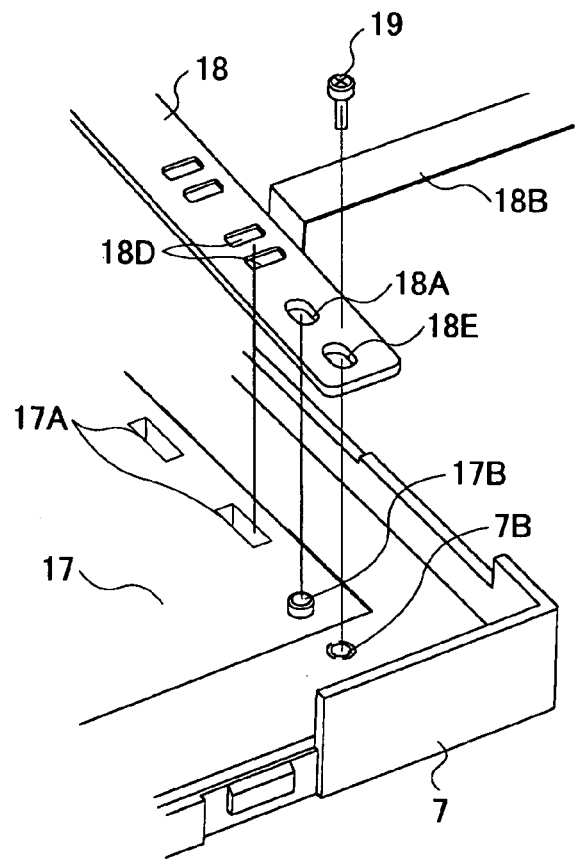
FIG. 10 is a perspective view of a structure of fixing the printed circuit board shown in FIG. 8 to a frame.

FIG. 10 is a perspective view showing a structure to fix the printed circuit board shown in FIG. 8 to the frame. The printed circuit board 18 is provided with screw holes 18E on outer side of the through holes 18A that fit protrusions 17B of the light-guiding member 17. The printed circuit board 18 extends outside the light-emitting member 17, and is fixed to screw holes 17 of the frame 7 by screws 19.

Figure 11:
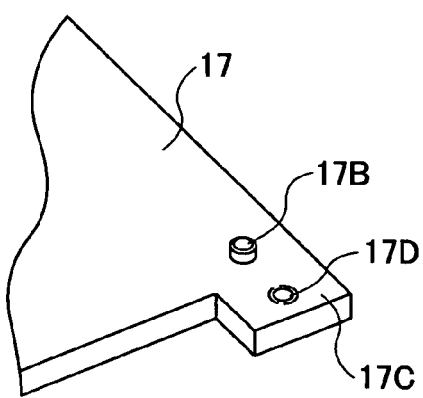
FIG. 11 is a perspective view of a part of a light-guiding member where the printed circuit board shown in FIG. 8 is mounted to the light-guiding member.

Additionally, protruding parts 17C may be provided at corners of the light-guiding member 17 as shown in FIG. 11, and screw holes 17D may be formed in the protruding parts 17C so as to directly securing the printed circuit board 18 to the light-guiding member 17 by screws.

As mentioned above, in the present embodiment, since light-emitting diodes 9 are fitted into the opening parts 17A of the light-guiding member 17, respectively, each of the light-emitting diodes 9 can be mounted to the light-guiding member 17 in a state where there is little air gap between the light-emitting surfaces of the light-emitting diodes 9 and inner surfaces of the opening parts 17A (that is, side surfaces of the light-guiding member 17). Moreover, since there is no need to mount the light-emitting diodes 9 to the printed circuit board 18, the printed circuit board 18 can be simplified.

Figure 13:
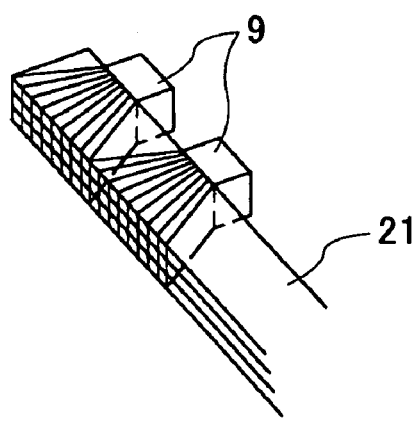
FIG. 13 is an enlarged perspective view of a part where the light-emitting diodes shown in FIG. 12 are mounted.
Figure 14:
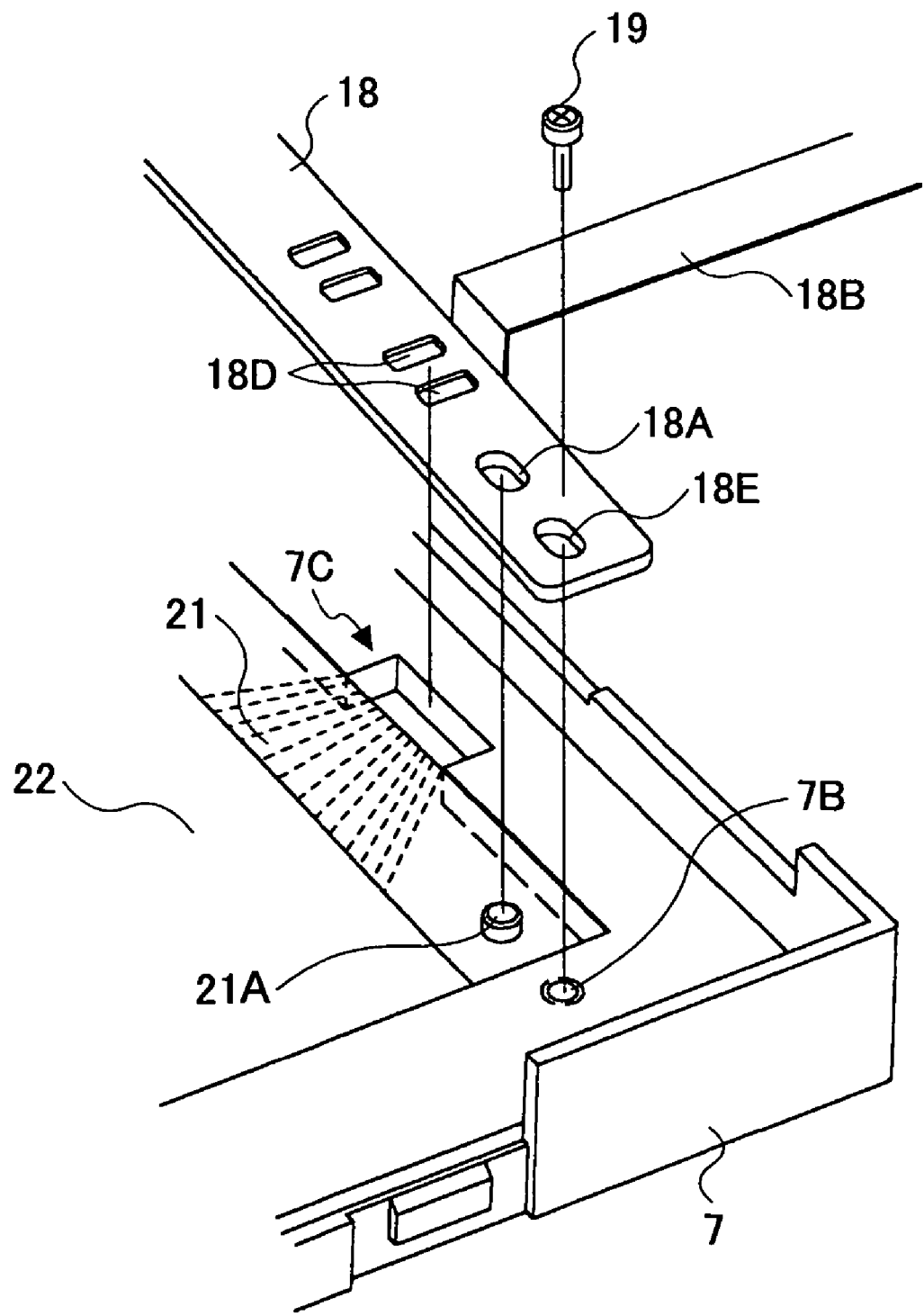
FIG. 14 is a perspective view of a structure of mounting a printed circuit board to the light-emitting diodes shown in FIG. 12.

A description will now be given, with reference to FIGS. 12 through 14, of a fourth embodiment of the present invention.

Figure 12:
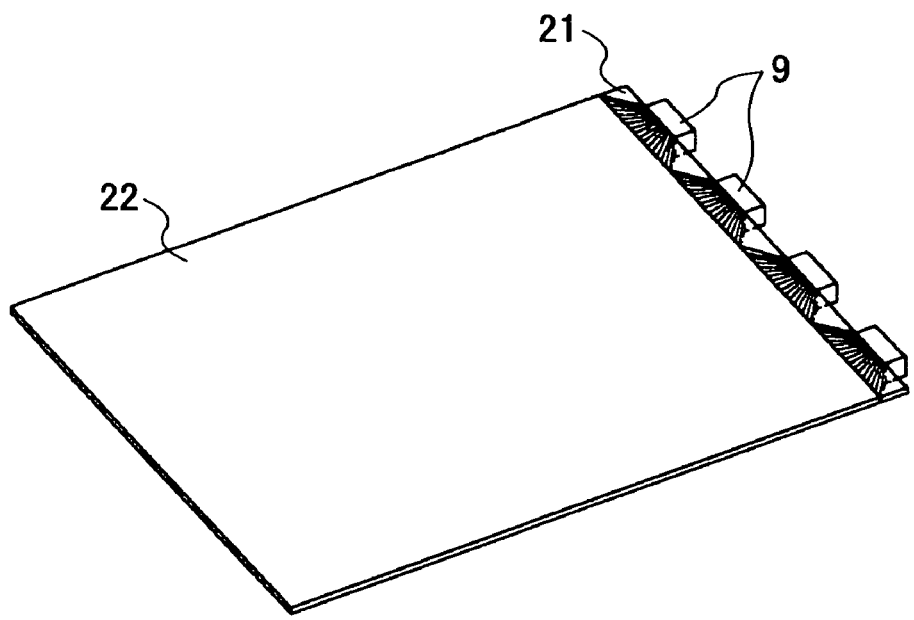
FIG. 12 is a perspective view of a structure of mounting light-emitting diodes to a light-guiding member in a liquid crystal display device according to a fourth embodiment of the present invention.

FIG. 12 is a perspective view showing a structure of mounting light-emitting diodes to a light-guiding member in a liquid crystal display device according to a fourth embodiment of the present invention. FIG. 13 is an enlarged perspective view of a part where the light-emitting diodes shown in FIG. 12 are mounted.

In FIG. 12, an optical fiber member 21 is provided between each of the light-emitting diodes 9 and the light-guiding member 20. The optical fiber member 21 is a member formed by shaping bundled optical fibers in a sector form and fixing the shape. By locating the light-emitting diode 9 at a root of the sector form, a light emitted from the light-emitting diode 9 propagates in the optical fibers and travels in the sector form, and finally enters the side surface of the light-guiding member 22.

By providing the optical fiber member 21, the light from the light-emitting diodes 9 is caused to enter the light-guiding member 22 while being forcibly diverged, which reduces variation in luminance of the light-guiding member 22. It should be noted that a method of bundling and fixing optical fibers is a well-known technique, and a description thereof will be omitted.

In the above-mentioned structure, the optical fiber member 21 can be handled together with the light-guiding member 22 by attaching the optical fiber member 21 to the light-guiding member 22 using an adhesive. Moreover, the structure which connects the light-emitting diodes 9 to the printed circuit board can be similar to, for example, the structure shown in FIG. 10. FIG. 14 is a perspective view of a structure of mounting the printed circuit board to the light-emitting diodes shown in FIG. 12. In the structure shown in FIG. 14, recessed parts 7C are formed in the frame 7, and the light-emitting diodes 9 are accommodated in the recessed parts 7C, respectively. The connection between the light emitting diodes 9 and the printed circuit board 18 is the same as the structure shown in FIG. 10, and a description thereof will be omitted. However, in the present embodiment, protrusions 21A fit to the through holes 18A of the printed circuit board 18 are formed in the optical fiber member 21.

As mentioned above, according to the present embodiment, the light from the light-emitting diodes 9 is caused to enter the light-guiding member 22 while being forcibly diverged, which reduces variation in luminance of the light-guiding member 22.

The present invention is not limited to the specifically disclosed embodiments, and variations and modifications may be made without departing from the scope of the present invention.

The present application is based on Japanese patent application No. 2004-206332 filed Jul. 13, 2004, the entire contents of which are hereby incorporated herein by reference.

What is claimed is:

1. A liquid crystal display device having a back light illumination, comprising:
    a light-guiding member provided on a backside of a liquid crystal panel; and
    a plurality of light sources that emit light toward a side surface of the light-guiding member,
    wherein the light sources are fixed to said light-guiding member by being fitted in an opening part of said light-guiding member in a state where electrodes to which an electronic power for driving the light sources is supplied are exposed, and a board having electrodes that are brought into detachable contact with the electrodes of said light sources is arranged on said light sources,
    said liquid crystal display device further comprising a positioning arrangement that positions said board to said light-guiding member so as to firmly hold said plurality of light sources in place within said opening part of said light guiding member.

2. The liquid crystal display device as claimed in claim 1, wherein the electrodes of said board are formed on protruding parts that are formed by deforming said board.

3. A liquid crystal display device having a back light illumination, comprising:
    a light-guiding member provided on a backside of a liquid crystal panel; and
    a plurality of light sources that emit light toward a side surface of the light-guiding member,
    wherein an optical part is provided between said light sources and said light-guiding member so as to guide the light from said light sources to said light-guiding member while diverging the light,
    wherein said optical part is attached to but a separate part from said light-guiding member and the light from said light sources is incident on said light-guiding member after passing through said optical part.

4. The liquid crystal display device as claimed in claim 3, wherein said optical part is fixed to the side surface of said light-guiding member.

5. The liquid crystal display device as claimed in claim 3, wherein said optical part includes a plurality of optical fibers integrally formed with each other so as to radially extend in a substantially sector pattern from positions where said light sources are provided.

6. The liquid crystal display device as claimed in claim 3, wherein said light-guiding member is fixed to a frame, and said light sources are accommodated and fixed in a recessed part provided in the frame.

7. The liquid crystal display device as claimed in claim 6, further comprising a positioning arrangement that positions said board to said light-guiding member.

* * * * *